May 30, 1944.  W. SCHRADER  2,349,992
DEVICE FOR INDICATING CONTAMINATIONS IN
THE OIL CIRCULATION SYSTEM
Filed Oct. 10, 1940
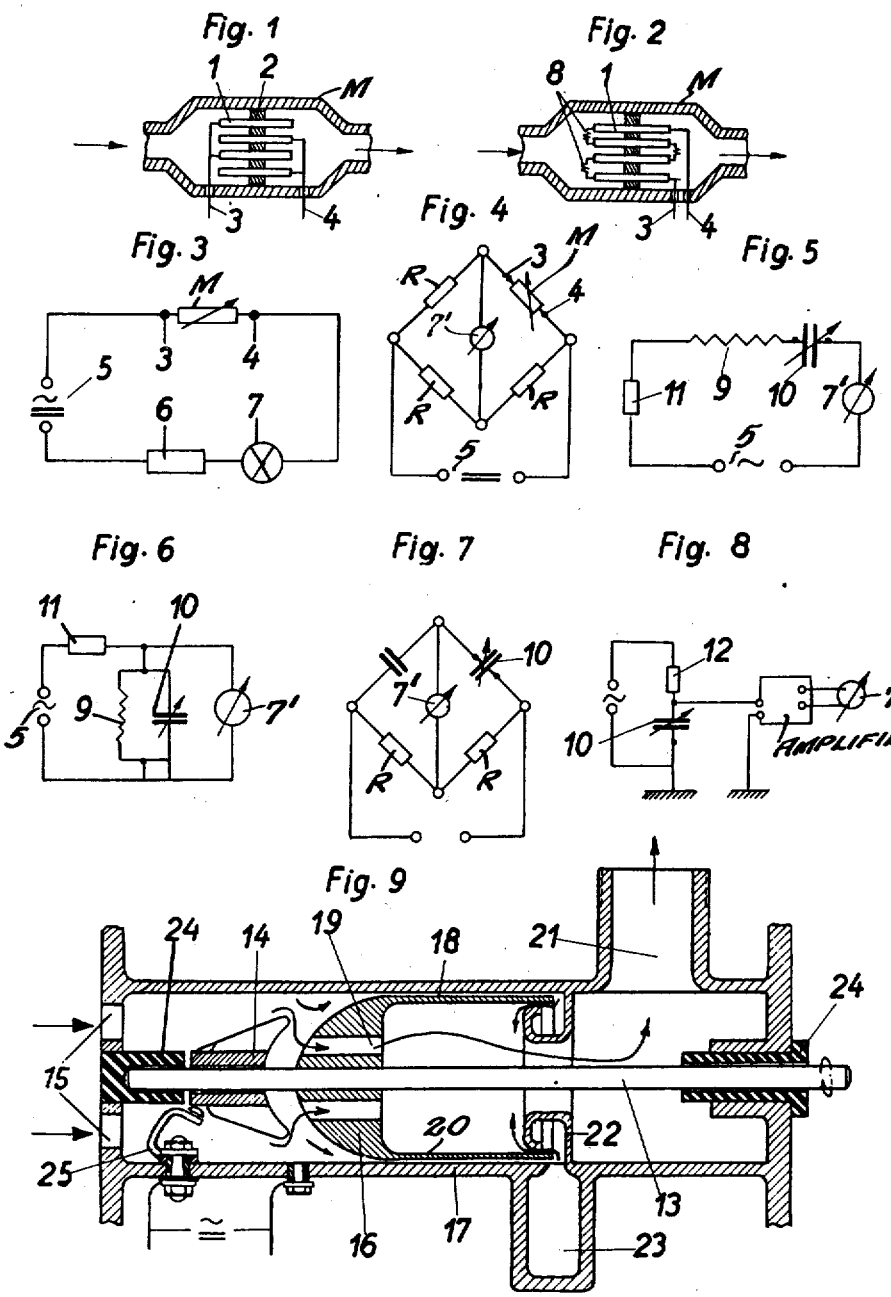
Inventor:
Walter Schrader
by Knight Bros
Attorneys Patented May 30, 1944

2,349,992

UNITED STATES PATENT OFFICE 2,349,992

DEVICE FOR INDICATING CONTAMINATIONS IN OIL CIRCULATION SYSTEMS

Walter Schrader, Doberitz, near Berlin, Germany; vested in the Alien Property Custodian Application October 10, 1940, Serial No. 360,689
In Germany October 23, 1939

11 Claims. (Cl. 175—183)

The invention relates to a device for indicating contaminations as they are produced, e. g. by metal particles, carbon or the like, in the oil circulation system of internal combustion engines.

It is important for the operation of internal combustion engines, especially highly stressed aircraft engines, that it is possible to ascertain and eliminate foreign bodies in time in the oil circulation system, particularly small metal particles. The presence of an increased quantity of metal particles in the oil circulation system during operation is further an indication of damage to the frictional surfaces, e. g. in the bearings, cylinders or on the pistons, which could lead to the destruction of the internal combustion engine. It is therefore desirable to have a univocal indication of the presence of foreign bodies in the oil circulation system in order to be able to check the internal combustion engine in time.

The invention proposes, for the purpose of timely ascertaining contaminations in the oil circulation system of an internal combustion engine, to determine and measure the changes caused by these contaminations in the state of an electric control circuit. This circuit is, for instance, so designed that variations of its capacity or resistance, produced by contaminations, are indicated. For this purpose, a measuring chamber, preferably designed in the manner of a filter with probe elements sensitive to the contaminations in the oil, is inserted in the oil circulation system, and its operating conditions are electrically observed and indicated. The probe elements may either be electrically joined in parallel or series connection, or they may be insulated from each other. Preferably filter elements are used as probe elements. These filter elements are, for instance, connected with a current source in series connection with a resistance and an indicating device, preferably a glow lamp. Instead of a glow lamp, it is, of course, also possible to employ another electric indicating device. With an increasing accumulation of metal particles or carbon between the filter elements, variations of voltage and current occur which are indicated by the glow lamp or the like indicator.

The invention will be more fully understood from the examples illustrated in the drawing, wherein Fig. 1 shows a measuring chamber with several filter elements alternately connected with each other in the manner of a condenser;

Fig. 2 shows a measuring chamber with the filter elements connected in series in the manner or a resistance;

Fig. 3 represents a possible circuit for operating a measuring chamber according to Fig. 2;

Fig. 4 is another circuit diagram for a measuring chamber according to Fig. 2;

Figs. 5 to 8 show circuit connections for a measuring chamber according to Fig. 1;

Fig. 9 shows a longitudinal section through a particular embodiment of a measuring chamber in conjunction with a centrifuge.

The measuring cell M represented in Fig. 1 has in its interior ribbon-shaped, lattice-like or disk-shaped filter elements 1 which are insulated from one another by distance pieces 2. The filter elements 1 are alternately connected with each other in the manner of a condenser. The terminal connections 3 and 4 are brought out of the casing. The measuring chamber is inserted in the oil circulation system (not represented) of an internal combustion engine, and the terminal conductors 3 and 4 are connected in the circuit of an electric current source. When foreign bodies are present in the oil stream flowing, in the direction of the arrows, along the filter elements 1, or when the oil changes its condition to such an extent that its electric resistance is considerably different from the original value or from the resistance of an oil in good working condition, the occurring current or voltage variations in the above-mentioned circuit effect the release of an indicating device.

If the variations of the electric resistance between the filter elements are to be measured, the usual circuits of Figs. 3 and 4 may be used either with continuous or alternating current. The terminals 3 and 4 of the filter elements 1, as shown in Fig. 3, are put in the circuit of the source 5 of direct or alternating current, in series with a ballast resistance 6 and a glow lamp 7 as indicating device. When the resistance between the filter elements 1 varies due to accumulations of metal particles, carbon or the like, the glow lamp 7 flashes up, depending upon the dimensioning of the resistance 6. The resistance 6 can be so chosen that under normal operating conditions the glow lamp is either fully extinguished or continues to glimmer with low intensity. If a particularly high sensitiveness is desired, the measuring cell M with the terminals 3 and 4 of the filter elements 1 can be put in a bridge branch of a Wheatstone bridge according to Fig. 4, the indicating device 7' being connected in the diagonal of the bridge. The current source 5 of the bridge may be for alternating or direct current. Resistors R are arranged in the three other branches of the bridge circuit.

Circuits of the type shown in Figs. 3 and 4 can also be used for a measuring cell in which the filter elements are connected in series according to Fig. 2. In this case the filter elements represent an electric resistance and are preferably either made of resistance material or have connected between every two filter elements an additional resistance 8. Any accumulation of foreign bodies, e. g. metal particles, between the filter elements 1 in a measuring chamber according to Fig. 2 causes a variation of the total resistance due to the variation of the shunt resistance effective, between the filter elements 1, and this variation in total resistance causes, in turn, a corresponding variation of voltage or current.

If it is desired, instead of measuring the resistance according to Figs. 3 and 4, to measure the variations of capacity, then the circuits according to Figs. 5 to 8 can be used in conjunction with a measuring cell of a construction corresponding in principle to that of Fig. 1. A direct short circuit between the filter elements 1 through the medium of the foreign bodies must be avoided, so that the foreign bodies accumulating between the filter elements have merely the effect of varying the capacity of the condenser represented by the filter elements. As a result, the current or voltage in the measuring circuit is changed accordingly.

For measuring the current, a connection according to Fig. 5 can be used, in which case an inductance coil 9 is adapted to the condenser 10' consisting of the filter elements 1 and to the frequency of the current source 5. The coil 9 and the condenser are connected in series. The circuit is also provided with a ballast resistance 11. The oscillatory circuit comprising the inductance coil 9 and the condenser 10 is preferably tuned to the resonance curve peak. The variation of capacity of the condenser due to the accumulation of foreign bodies between the filter elements 1 causes a simultaneous variation of the tuning of the oscillatory circuit, which is now tuned to another point of the resonance curve. This variation of the tuning of the oscillatory circuit is indicated by the indicating device 7' which in this case is an alternating current apparatus.

For measuring changes in capacity by determining voltage variations, the coil 9 and the condenser 10 of the oscillatory circuit are connected, according to Fig. 6 in parallel. The resistance of this oscillatory circuit is practically infinite in the case of resonance, whereas in the connection according to Fig. 5 the resistance of the oscillatory circuit in the case of resonance is practically zero. Also in the connection according to Fig. 6, a limiting resistance 11 is provided.

If a particular sensitiveness is required in the case of capacity measurements, one of the known bridge methods may be applied with the aid of a circuit similar to that if Fig. 7. The indicating device 7' in the bridge diagonal shows directly the variations of the capacitance of the condenser 10.

Instead of the bridge method, the usual microphone connection shown in Fig. 8 can also be used. It is only necessary to replace the microphone by the condenser 10 consisting of the filter elements 1. Between the condenser 10 and the resistance 12, the variations of voltage are either directly indicated or, preferably, amplified by an amplifier. There is also the possibility of causing the voltage variations to release a sound signal or the like.

The measuring cell can be inserted directly into the oil circulation system or in a branched-off part of the oil circulation system. It is also possible to centrifuge the total amount or a part of the oil in the oil circulation system and to pass only an oil stream carrying a high percentage of foreign bodies through the measuring cell.

Fig. 9 shows a measuring cell, in the interior of which a shaft 13 is mounted, which carries in the vicinity of the oil inlet 15 a rotor 14 operating as a centrifuge. A cylindrical body 16, leaving in the casing 17 an annular interstitial passage 18, is also mounted on the shaft 13. The front part of the cylindrical body 16 may be shaped approximately streamlined and provided with bores 19, through which the oil cleaned by the rotor is passing. The cylindrical body 16 has a cylindrical extension 20 which is open in the direction of the oil outlet 21 of the measuring chamber. The end of the cylindrical extension 20 projects into an annular channel 22 connected with casing 17. The oil delivered by the rotor 14 through the bores 19 into the cylindrical extension 20 flows in the direction of the arrow directly to the outlet 21 of the measuring chamber. The centrifuged oil carrying a high percentage of foreign bodies is delivered to the narrow annular passage 18 formed between the cylindrical extension 20 and the casing 17, and thence pressed into the annular channel 22. In this annular channel 22 the foreign bodies are precipitated in order to be collected in the adjacent sump 23.

According to the illustrated form of construction, the cylindrical body 16 and the cylindrical extension 20 rotate together with the shaft 13. In this case, the shaft 13 is insulated from the casing 17 at 24, and the cylindrical body with its cylindrical extension is connected to a source of current by a slip ring arrangement 25. The casing 17 of the measuring chamber is likewise connected to the source of current, so that the occurrence of foreign bodies in the oil, delivered by the rotor 14 to the narrow annular passage 18, causes a variation of the resistance of the cell or changes the capacity of the condenser formed by the cylindrical body and its extension 20 with the casing 17.

If it is not desired to use a slip ring arrangement 25, the device can be so designed that the cylindrical body 19 and/or the cylindrical extension 20 are mounted independently of the shaft 13 in the casing 17 and directly connected to the source of current.

I claim:
1. Apparatus for determining contaminations in the oil circulating system of internal combustion engines, comprising a measuring cell inserted in the circulation system so as to be traversed by the oil circulating in the system, said cell containing filter elements of conducting material exposed to the oil for retaining in said cell part of the contaminations, and electric circuit terminals connected to said elements.

2. Apparatus for determining contaminations in the oil circulating system of internal combustion engines, comprising a measuring cell inserted in the circulation system so as to be traversed by the oil circulating in the system, said cell containing filter elements of conducting material for retaining part of the contaminations, said filter elements being spaced from one another and electrically connected in series with one another.

3. Apparatus for determining contaminations in the oil circulating system of internal combustion engines, comprising a measuring cell inserted in the circulation system so as to be traversed by the oil circulating in the system, said cell containing filter elements for retaining part of the contaminations, said filter elements being spaced and insulated from one another and arranged to form the electrodes of an electrical condenser with the oil between said elements forming the dielectric of the condenser, and electric terminals connected to said condenser.

4. Apparatus for determining contaminations in an oil circulation system, comprising separating means for causing an oil quantity rich in contaminations to flow separately from less contaminated oil, electrically conducting elements disposed in spaced relationship to one another to form a passage for said oil quantity, and electric terminals connected with said elements.

5. Apparatus for determining contaminations in an oil circulation system, comprising a filtering device having a multiciplicity of filter elements arranged in the form of a filter lattice, said elements consisting of electrically conductive material and being spaced and electrically insulated from one another, said filtering device being connected in the circulating system so as to be traversed by oil circulating in said system, and electric terminals connected to said elements.

6. Apparatus for determining contaminations in an oil circulation system, comprising centrifuge means for causing a stream of oil rich in contaminations to separate from less contaminated oil, conduit means arranged to form a passage for said stream of oil and containing electrically conducting surface elements insulated and spaced from each other so as to leave a narrow interstice forming part of said passage, and electric terminals connected to said elements.

7. Apparatus for determining contaminations in an oil circulation system, comprising a cylindrical casing to be connected in the circulation system to be traversed by oil flowing in said system, a centrifuge shaft arranged in said casing and coaxially thereto, a centrifuge rotor mounted on said shaft for causing, when in operation, a stream of oil enriched with contaminations to flow along the periphery of said cylindrical casing, a hollow cylindrical body arranged in said casing concentrically to said shaft, said body having its outer wall together with the interior wall of said casing form an interstitial passageway for said stream and its interior form a passage for the centrally flowing portion of the centrifuged oil, said body and said casing being electrically insulated from each other, and electric terminals connected respectively to said body and casing.

8. Apparatus for determining contaminations in an oil circulation system, comprising a cylindrical casing to be connected in the circulation system to be traversed by oil flowing in said system, a centrifuge shaft arranged in said casing and coaxially thereto, a centrifuge rotor mounted on said shaft for causing, when in operation, a stream of oil enriched with contaminations to flow along the periphery of said cylindrical casing, a hollow cylindrical body arranged in said casing and mounted on said shaft to rotate together with said rotor, said body having its outer wall disposed in close yet spaced and insulated relation to the inner wall of said casing to form a narrow interstitial passage for said stream, the end of said body adjacent to said rotor being tapered towards said rotor and having openings to permit the centrally flowing portion of the centrifuged oil to flow through the interior of said body.

9. Apparatus for determining contaminations in an oil circulation system, comprising a cylindrical casing to be connected in the circulation system to be traversed by oil flowing in said system, a centrifuge shaft arranged in said casing and coaxially thereto, a centrifuge rotor mounted on said shaft for causing, when in operation, a stream of oil enriched with contaminations to flow along the periphery of said cylindrical casing, a hollow cylindrical body arranged in said casing concentrically to said shaft and electrically insulated from said casing, said body having its outer wall together with the interior wall of said casing form an interstitial passageway for said stream and its interior form a passage for the centrally flowing portion of the centrifuged oil, the end of said body adjacent to said rotor being tapered towards said rotor and having openings to permit the centrally flowing portion of the centrifuged oil to flow through the interior of said body, a channel structure connected with said casing and forming a peripheral channel along the inner periphery of said casing, said channel structure being open towards the interior of said casing along a cylindrical opening directed towards said cylindrical body, the other end of said body extending through said opening so as to cause oil to flow from said passage into said channel before permitting it to reunite with the centrally flowing portion of the oil.

10. Apparatus for determining contaminations in an oil circulation system, comprising a casing connected in said system to be traversed by oil circulating in said system, a centrifuge rotor disposed in said casing to cause oil enriched with contaminations to flow along the periphery of said casing, a cylindrical hollow body disposed in said casing and having its outer wall together with the interior wall of said casing form an interstitial passageway for said stream and its interior form a passage for the centrally flowing portion of the centrifuged oil, said body and said casing being electrically insulated from each other, a channel structure connected with said casing and forming a peripheral channel along the inner periphery of said casing, said channel structure being open towards the interior of said casing along a cylindrical opening directed towards said cylindrical body and said body extending through said opening so as to cause oil to flow from said passage into said channel before permitting it to reunite with the centrally flowing portion of the oil, a hollow extension connected with said casing and having its interior communicating with said channel to form an oil sump.

11. Apparatus for determining contaminations in a lubricant circulation system, means for locally concentrating contaminants in the lubricant, electrically conductive elements disposed in spaced relationship so as to form a passage for said lubricant and electric terminals connected with said elements.

WALTER SCHRADER.